United States Patent
Beam et al.

(10) Patent No.: US 10,060,778 B2
(45) Date of Patent: Aug. 28, 2018

(54) ANALYSIS OF AIRFLOW USING IONIZATION

(71) Applicant: SCHNEIDER ELECTRIC IT CORPORATION, West Kingston, RI (US)

(72) Inventors: Jeffrey Stephen Beam, Wood River, IL (US); Daniel J. Rohr, Wildwood, MO (US)

(73) Assignee: SCHNIEDER ELECTRIC IT CORPORATION, West Kingston, RI (US)

( * ) Notice: Subject to any disclaimer, the term of this patent is extended or adjusted under 35 U.S.C. 154(b) by 50 days.

(21) Appl. No.: 15/302,234

(22) PCT Filed: Apr. 8, 2014

(86) PCT No.: PCT/US2014/033306
§ 371 (c)(1),
(2) Date: Oct. 6, 2016

(87) PCT Pub. No.: WO2015/156773
PCT Pub. Date: Oct. 15, 2015

(65) Prior Publication Data
US 2017/0038236 A1 Feb. 9, 2017

(51) Int. Cl.
*G01F 1/708* (2006.01)
*H01T 23/00* (2006.01)

(52) U.S. Cl.
CPC ........... *G01F 1/7088* (2013.01); *H01T 23/00* (2013.01)

(58) Field of Classification Search
CPC .. G01F 1/56; G01F 1/07; H01T 23/00; B01D 59/44
See application file for complete search history.

(56) References Cited

U.S. PATENT DOCUMENTS

| | | | | |
|---|---|---|---|---|
| 4,905,579 | A * | 3/1990 | Dame | E02D 31/008 136/291 |
| 6,327,905 | B1 * | 12/2001 | Itsuji | G01F 1/696 73/204.15 |
| 7,115,861 | B2 * | 10/2006 | Livi | H01J 49/40 250/290 |
| 7,523,673 | B1 * | 4/2009 | Chorpening | G01F 1/64 73/861.09 |
| 2009/0248208 | A1 | 10/2009 | Fukushima et al. | |
| 2013/0069121 | A1 * | 3/2013 | Murai | G01N 27/4148 257/253 |
| 2013/0325368 | A1 | 12/2013 | Robb | |
| 2017/0084443 | A1 * | 3/2017 | Willis | H01J 49/40 |

OTHER PUBLICATIONS

International Search Report from corresponding International Application No. PCT/US2014/033306 dated Sep. 12, 2014.

* cited by examiner

*Primary Examiner* — Jewel V Dowtin
(74) *Attorney, Agent, or Firm* — Lando & Anastasi, LLP

(57) ABSTRACT

The present disclosure is directed to systems and methods for measuring airflow. In one example, an airflow monitor includes an ion generator positioned in a controlled space, an ion detector positioned in the controlled space and spaced from the ion generator, and a controller configured to receive a signal from the ion detector, to measure a time between emission of ions from the ion generator and detection of ions at the ion detector, and to calculate a speed of airflow between the ion generator and the ion detector based on the measured time.

20 Claims, 11 Drawing Sheets

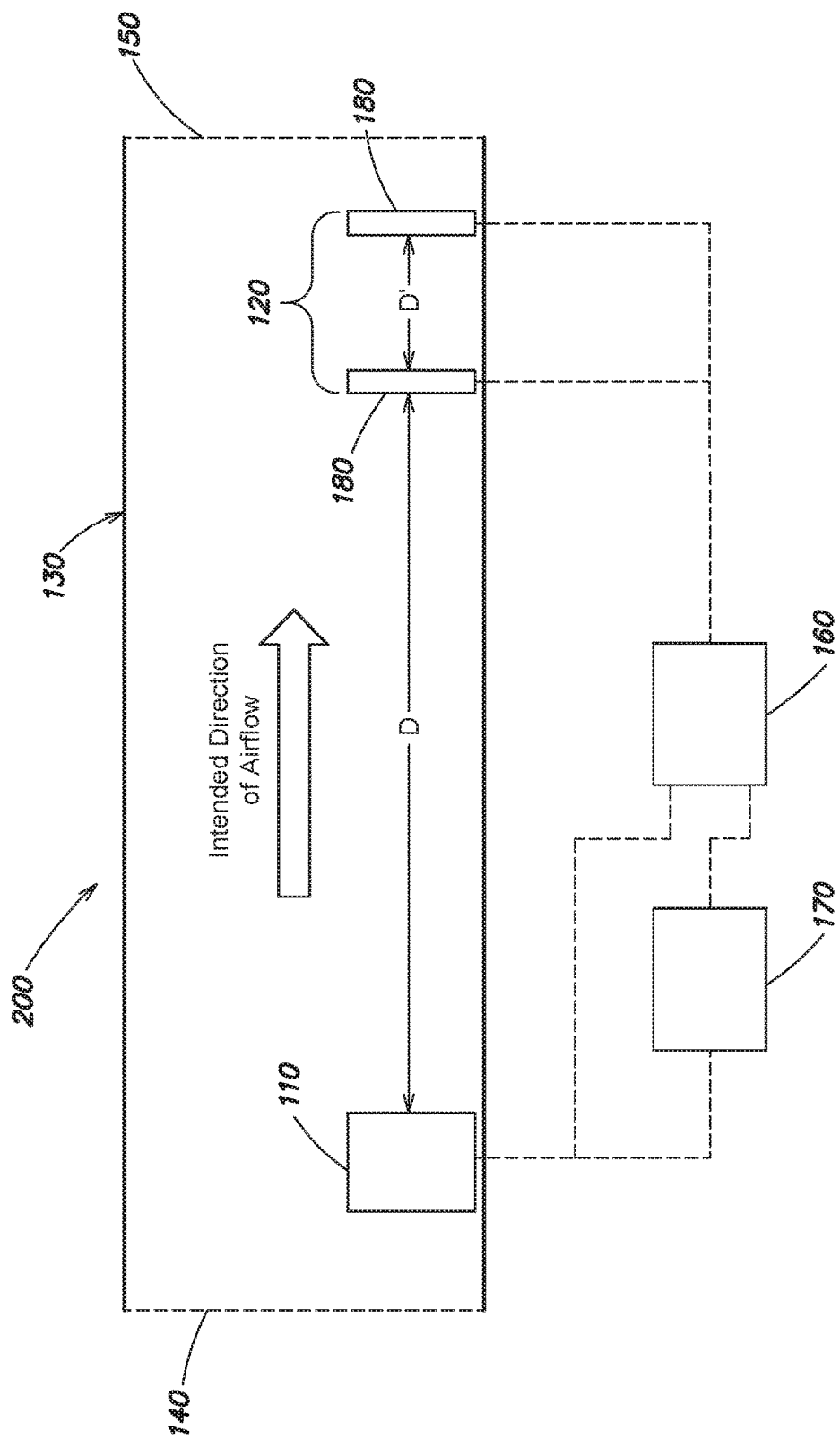

ANALYSIS OF AIRFLOW USING IONIZATION

CROSS-REFERENCE TO RELATED APPLICATIONS

This application is a U.S. National Stage Application under 35 U.S.C. § 371 of International Application No. PCT/US2014/033306, filed Apr. 8, 2014, titled ANALYSIS OF AIRFLOW USING IONIZATION, which is hereby incorporated herein by reference in its entirety.

BACKGROUND

1. Field of Disclosure

Aspects and embodiments disclosed herein relate generally to methods and systems for monitoring and controlling airflow in an environment.

2. Discussion of Related Art

Centralized data centers for computer, communications, and other electronic equipment have been in use for a number of years, and more recently with the increasing use of the Internet, large scale data centers that provide hosting services for Internet Service Providers (ISPs), Application Service Providers (ASPSs), and Internet content providers are becoming more prevalent. Typical centralized data centers contain numerous racks of equipment that require power, cooling, and connections to external communications facilities. In modern data centers and network rooms, the increased density of computing equipment used in these facilities has put strains on the cooling and power systems of the facilities. In the past, typical power consumption for each equipment enclosure in a data facility was on the order of 1 kW. With the use of server blades and other high power density equipment in equipment racks, it is not uncommon for an equipment rack to have a power draw of 10 kW or even as high as 25 kW.

The power consumed by computer equipment is converted to heat and typically the cooling requirements of a facility are determined based on the power requirements of the facility. In some embodiments, air is circulated through equipment racks housing the computer equipment and may be directed into a warm or hot aisle defined by rows of the equipment racks. Heated air may be withdrawn from the warm or hot aisle, cooled, and returned to a cold aisle defined by the rows of equipment racks on the opposite side of the equipment racks from the warm or hot aisles for recirculation through the equipment racks. The warm or hot aisle is often separated from the cold aisle by the equipment racks, walls of the data center, and/or other containment structures.

Some data centers utilize air plenums under raised floors to distribute cooling air through a data center. One or more computer room air conditioners (CRACs) or computer room air handlers (CRAHs) are distributed along the periphery of the data room, and these units draw return air from the room or a ceiling plenum and distribute cooling air beneath the raised floor. Perforated tiles may be placed in front or beneath racks of equipment to be cooled to allow the cooling air from beneath the floor to cool equipment within the racks.

Other data centers may include cooling units integrated in the rows of equipment racks or located outside of the room housing the equipment racks and computer equipment. Structures other than raised floors, for example, ceiling plenums, open spaces between rows of equipment racks, and/or other air flow conduits may be provided for the circulation of air through a data center for cooling computer equipment contained in the data center.

Several tools are available to assist a data center designer in configuring a layout of a data center to provide necessary power and cooling to equipment to be located in the data center. These tools typically assist a designer in determining total power requirements and accordingly overall cooling requirements for a data center. In addition, these tools may assist a designer in determining optimum equipment layout and proper sizing of power cabling and circuit breakers.

Such tools often fail to account for situations which often occur in real life installations, which can dramatically affect the cooling performance of a data center. For example, in a facility using a raised floor, the absence of one or more floor panels, or the misplacement of one or more perforated floor panels can greatly affect the cooling performance of the data center and cause the actual performance to vary greatly from a calculated idealized performance. Further, the degradation in performance of one or more air conditioning units can drastically change airflow and cooling characteristics of a facility.

The inability to properly analyze the cooling performance of a facility can cause a data center designer to over design the facility from a cooling perspective, which results in the facility being more expensive and less efficient than necessary.

SUMMARY

In accordance with an aspect of the present disclosure, there is provided an airflow monitor system. The airflow monitor system comprises a controlled space and an ion generator positioned in the controlled space and configured to produce ions. The airflow monitor system further comprises first ion detector positioned in the controlled space and spaced from the ion generator, the first ion detector being configured to detect ions produced by the ion generator and send one or more signals responsive to detecting the ions, and a controller configured to receive the one or more signals from the ion detector, to measure a time between emission of the ions from the ion generator and detection of ions at the ion detector, and to calculate a speed of airflow between the ion generator and the ion detector based on the measured time.

In some embodiments, the controlled space comprises a conduit. The conduit may include an upstream end and a downstream end. The ion generator may be positioned between the upstream end and the downstream end of the conduit. The first ion detector may be positioned between the ion generator and the downstream end of the conduit. A second ion detector may be positioned between the ion generator and the upstream end of the conduit.

In some embodiments, the conduit is configured to attenuate, impede, or reduce propagation of electromagnetic interference from outside the conduit to the first ion detector.

In some embodiments, the controller is further configured to calculate a differential pressure between a first end of the conduit and a second end of the conduit based on the measured time.

In some embodiments, the system further comprises a source of pulses of high voltage electricity in electrical communication with the ion generator.

In some embodiments, the controller is in communication with a cooling system of a room in which the airflow monitor system is disposed, and the cooling system is configured to adjust the speed of one or more fans of the cooling system responsive to the speed of airflow calculated by the controller.

In some embodiments, the first ion detector comprises a first antenna. The first ion detector may further include a second antenna.

In some embodiments, the controller includes a differential amplifier configured to measure a difference in voltage between the first antenna and the second antenna.

In some embodiments, the conduit includes an upstream end and a downstream end, the ion generator is positioned between the upstream end and the downstream end, the first antenna is positioned between the ion generator and the downstream end, and the second antenna is positioned between the ion generator and the upstream end.

In some embodiments, the first antenna and the second antenna are electrically matched.

In accordance with another aspect of the present disclosure, there is provided a method of monitoring airflow across a region of space. The method comprises generating a packet of ions in air at an ion generator, detecting ions produced by the ion generator at a first ion detector spaced from the ion generator by a distance, and calculating a speed of airflow between the ion generator and the first ion detector from the distance and a measured time between generating the packet of ions and detecting the ions.

In some embodiments, generating the packet of ions comprises generating the packet of ions within a conduit in which both the ion generator and the ion detector are disposed. The conduit may include an upstream end and a downstream end. The ion generator may be positioned between the upstream end and the downstream end of the conduit. The first ion detector may be positioned between the ion generator and the downstream end of the conduit. A second ion detector may be positioned between the ion generator and the upstream end of the conduit. The method may further comprise detecting the packet of ions at the second detector.

In some embodiments, the first ion detector includes a first antenna and a second antenna, and detecting the ions produced by the ion generator comprises detecting a differential voltage between the first antenna and the second antenna.

In some embodiments, the method further comprises controlling a speed of a fan of a cooling system of a room in which the ion generator and the first ion detector are disposed responsive to a calculation of the speed of airflow between the ion generator and the first ion detector.

In accordance with another aspect of the present disclosure, there is provided a non-volatile computer readable media having computer executable instructions included therein, which when executed by a controller of an airflow monitor system cause the airflow monitor system to generate a packet of ions in air at an ion generator, detect ions produced by the ion generator at an ion detector spaced from the ion generator by a distance, and calculate a speed of airflow between the ion generator and the ion detector from the distance and a measured time between generating the packet of ions and detecting the ions.

In some embodiments, the instructions cause the airflow monitor system to detect the ions produced by the ion generator by detecting a differential voltage between a first antenna of the ion detector and a second antenna of the ion detector.

In some embodiments, the instructions cause the airflow monitor system to control a speed of a fan of a cooling system of a room in which the ion generator and the first ion detector are disposed responsive to a calculation of the speed of airflow between the ion generator and the ion detector.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 is a schematic view of another embodiment of an airflow monitoring apparatus;

DETAILED DESCRIPTION

Figure 1A:
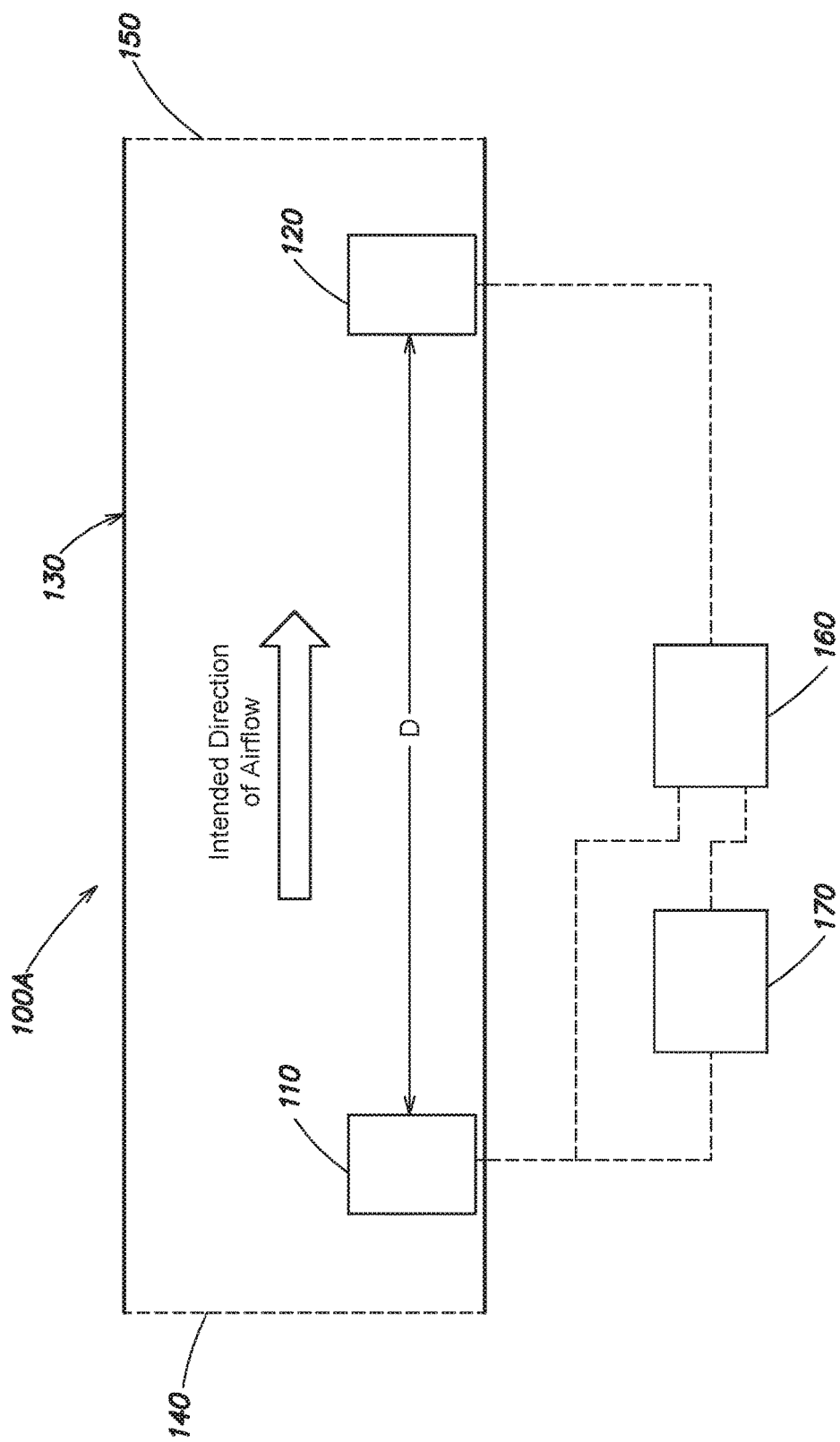
FIG. 1A is a schematic view of an embodiment of an airflow monitoring apparatus.

This disclosure is not limited in its application to the details of construction and the arrangement of components set forth in the following description or illustrated in the drawings. Aspects disclosed herein are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein may be utilized to monitor airflow across a region of space and to provide an indication of the monitored rate of airflow, or lack thereof, to an airflow control system. In some embodiments, the region of space may include a barrier within a hot or cold aisle containment system of a data center. The indication of the monitored rate of airflow may provide a control variable that may be used by the airflow control system to regulate fans of air conditioners or air handlers associated with the containment system. The airflow control system may adjust the speeds of the fans to achieve no more than a desired amount of airflow through a monitored region of space, thus minimizing fan power and reducing power consumption of a cooling system associated with the containment system.

Aspects and embodiments disclosed herein may provide a more sensitive instrument for the detection of airflow in and out of a containment system than other available measurement devices. Aspects and embodiments disclosed herein may therefore allow a more accurate control over fan speed than previously available measurement devices, and may provide for reducing or minimizing fan power consumption as compared to systems including less sensitive airflow detection instruments.

Many previously available airflow measurement devices suffer from various deficiencies which are avoided in various aspects and embodiments disclosed herein. For example, instruments that indirectly measure airflow using the cooling property of the moving air depend on other properties of the air that may not be accounted for, such as the density and absolute humidity of the air. These instruments only measure airflow at the point of the sensor, and disrupt the natural flow of air around the sensor. Instruments that require the movement of a mechanical plate or vane disrupt the natural flow of air at the sensing point and require a differential pressure large enough to overcome the static and kinetic frictional losses of such devices. Instruments that use a differential pressure to measure airflow, for example, pitot tubes and venturis, are typically insensitive at very low airflows.

In contrast, aspects and embodiments disclosed herein may directly measure air movement without depending on a measurement of a secondary effect caused by the movement of air. Aspects and embodiments disclosed herein may not need to impede or redirect the airflow in any way and may detect air movement in three dimensional space. Further, aspects and embodiments disclosed herein may have extremely low resistance to airflow which allows them to measure airflow at extremely low differential pressures.

Various aspects and embodiments disclosed herein may measure the speed of travel of one or more ionized packets of air to determine a rate of airflow across a region. The measurement of the speed of travel of the ionized packets of air provides a direct method to measure air movement without interfering in any significant way with the natural motion of the air. Systems and methods disclosed herein may require virtually no static pressure difference to sense the direction and speed of airflow across a region.

An embodiment of a system for measuring airflow is illustrated schematically in FIG. 1A, indicated generally at 100A. The system includes an ion generator 110 and an ion detector 120. The ion generator 110 and ion detector 120 are disposed within a conduit 130 which includes an upstream end 140 and a downstream end 150. The conduit 130 may have a circular cross-section, a rectangular cross-section, or any other cross-sectional shape desired. The conduit 130 preferably has a constant cross-sectional shape and/or area along the length of the conduit 130, although in alternate embodiments, the cross-sectional shape and/or area of the conduit 130 varies along the length of the conduit 130.

Figure 1B:
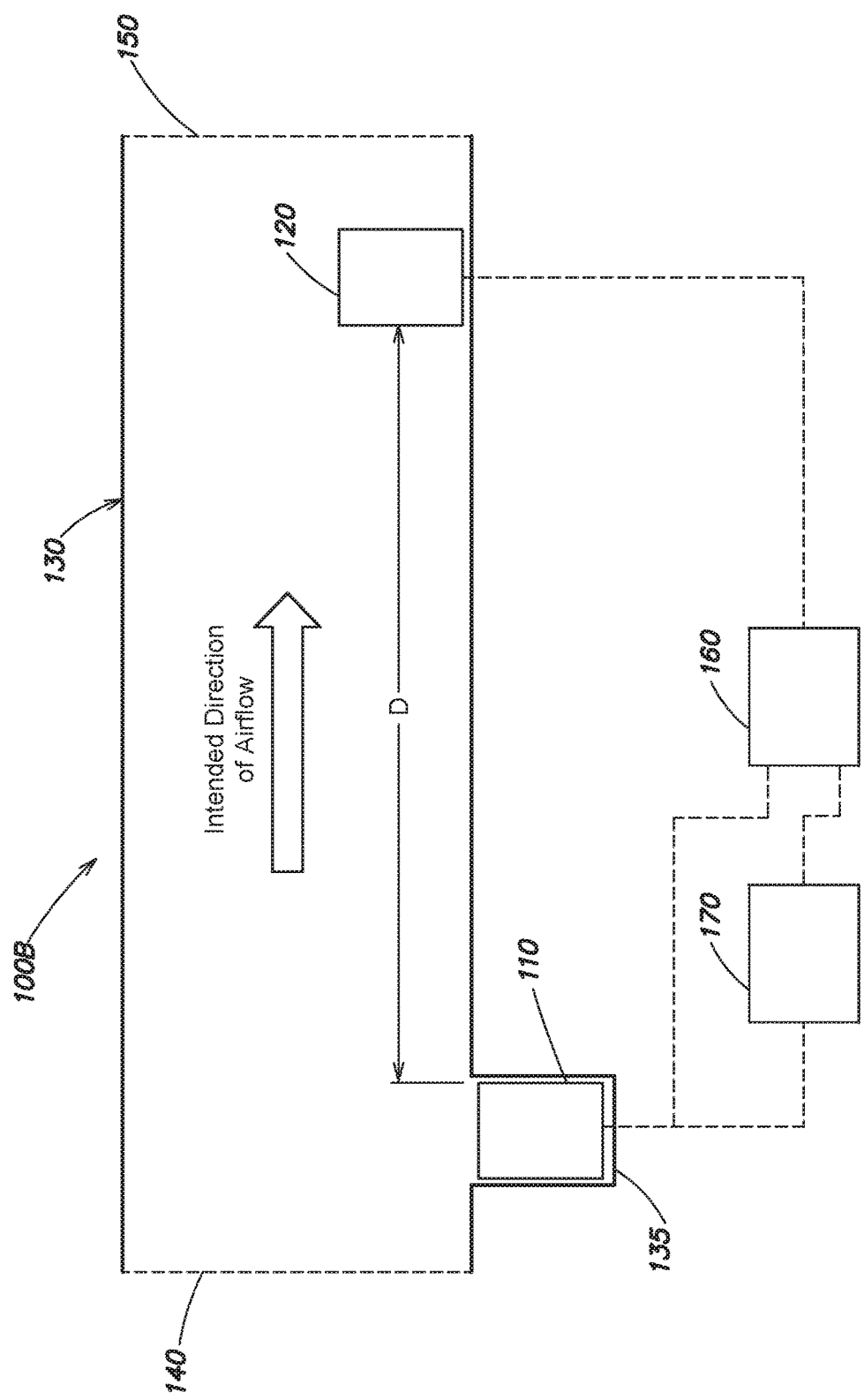
FIG. 1B is a schematic view of another embodiment of an airflow monitoring apparatus.

In another embodiment, indicated generally at 100B in FIG. 1B, the ion generator 110 is located outside of the airflow path through the conduit 130 in a separate conduit or channel 135 branched from, for example, perpendicular to the conduit 130. When ions are generated by the ion generator, they tend to be forced by repulsion from the ion generator 110 into the air stream through the conduit 130. This arrangement may reduce or eliminate any tendency of an airflow measurement being affected by the ions being propelled away from the ion generator 110 and toward the ion detector 120 under the influence of electrostatic repulsion. The arrangement illustrated in FIG. 1B may also reduce or eliminate any obstruction of airflow through the conduit 130 by the ion generator 110.

The ion generator 110 and ion detector 120 are in communication with a monitor/controller 160. The ion generator 110 may be in direct communication with the monitor/controller 160 and/or in communication with the monitor/controller 160 through a high voltage electricity source 170.

The monitor/controller 160 causes a high voltage pulse to be delivered to the ion generator 110 from the high voltage electricity source 170. The ion generator 110 utilizes the high voltage pulse to ionize air in the conduit proximate the ion generator 110. The monitor/controller 160 measures a time between the generation of the ionized air by the ion generator 110 and detection of the ionized air by the ion detector 120. The monitor/controller 160 measures airflow speed through the conduit 130 by dividing the measured time between the generation of the ionized air by the ion generator 110 and detection of the ionized air by the ion detector 120 by the distance D between the ion generator 110 and ion detector 120.

The ion generator 110 may include, for example, a needle or a fine gauge wire electrically coupled to the high voltage electricity source 170. In some embodiments, the ion generator 110 may include a spark generator coupled to the high voltage electricity source 170. The high voltage electricity source 170 may include, for example, an electrostatic discharge gun, an induction coil similar to an automotive ignition coil, a Tesla coil, a high voltage electrostatic generator, or any other alternating current or direct current high voltage source known in the art. The high voltage electricity source 170 provides electricity to the ion generator 110 at a voltage sufficient to ionize molecules of gas in air in the conduit, for example, at about 5,000 volts. The voltage provided to the ion generator 110 may be sufficient for the ion generator 110 to produce ionized gas in the air, but insufficient to generate a corona discharge or an arc. A high positive voltage pulse provided to the ion generator 110 from the high voltage electricity source 170 may be used to ionize nitrogen in the air, while a high negative voltage pulse provided to the ion generator 110 from the high voltage electricity source 170 may be used to ionize oxygen in the air.

The ion detector 120 may include an antenna or a pair of antennas in communication with a detector circuit in the monitor/controller 160 or separate from the monitor/controller 160. When separate from the monitor/controller 160, the detector circuit may be in communication with the monitor/controller 160. The detector circuit may include a differential amplifier to detect a difference in signals received from a pair of antennas, when present in the ion detector 120, and utilize the detected difference in signals as an indicator of the passage of a packet of ions proximate the ion detector. The differential amplifier may be a high gain differential amplifier, for example, with a gain of about 1,000×, a high impedance, and a very low input bias current, for example, about a few femtoamps, to provide reliable detection of a difference in electrical signals between the antennas of the ion detector 120, and thus, a reliable indication of the passage of a packet of ionized air proximate the antennas. An example of a suitable differential amplifier is the INA116 ultra low input bias current instrumentation amplifier, available from the Burr-Brown Corporation.

Referring to the system generally indicated at 200 in FIG. 2, when a pair of antennas 180 is used for the ion detector 120, the antennas may be spaced from one another by a distance D' in the direction of airflow through the conduit 130. The monitor/controller 160 may use one or both of the time that the pulse of ions from the ion generator 110 takes to cross the distance D between the ion generator 110 and the ion detector 120 and the time that the pulse of ions from the ion generator 110 takes to cross the distance D' between the antennas 180 of the ion detector 120 to determine a speed of airflow through the conduit 130.

The antennas 180 of the ion detector 120 may be in the form of lengths of insulated or non-insulated wires extending into the interior of the conduit 130. The two antennas 180 of the ion detector 120 may be electrically matched so that the monitor/controller 160 may be able to reject electrical noise that may be caused by ambient electromagnetic interference in a location where the airflow monitor system 200 is mounted. For example, when a differential amplifier is utilized to compare signals from the two antennas 180 of the ion detector 120, electrical noise common to both of the antennas 180 may be cancelled out.

Figure 3:
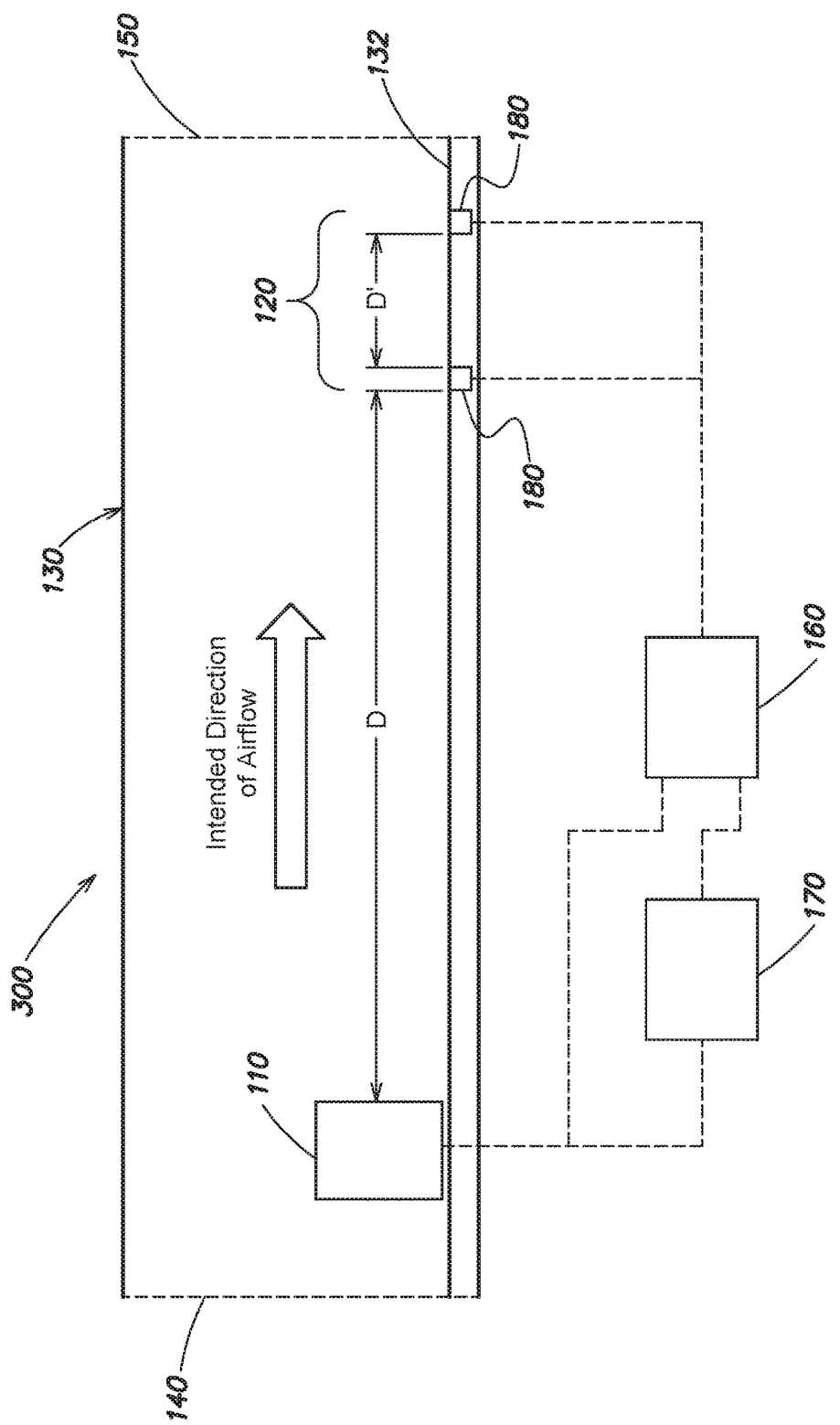
FIG. 3 is a schematic view of another embodiment of an airflow monitoring apparatus.

The antennas 180 are not limited to being formed of lengths of wire. The antennas 180 (or antenna if only one is used) may be any size or shape desired. For example, in one embodiment of a system for measuring airflow, indicated generally at 300 in FIG. 3, the antennas 180 may be flush against an internal surface of a wall 132 of the conduit 130 or embedded in the wall 132 of the conduit 130. In the airflow monitor system 300, the antennas 180 do not extend into the interior of the conduit 130 and thus, do not interfere with air flow through the conduit 130. The electric field of a packet of ions passing by the antenna or antennas 180 may be sensed at a distance by the antenna or antennas 180, and thus the antenna or antennas 180 need not extend into the conduit 130 to detect the passage of a packet of ions.

Figure 4:
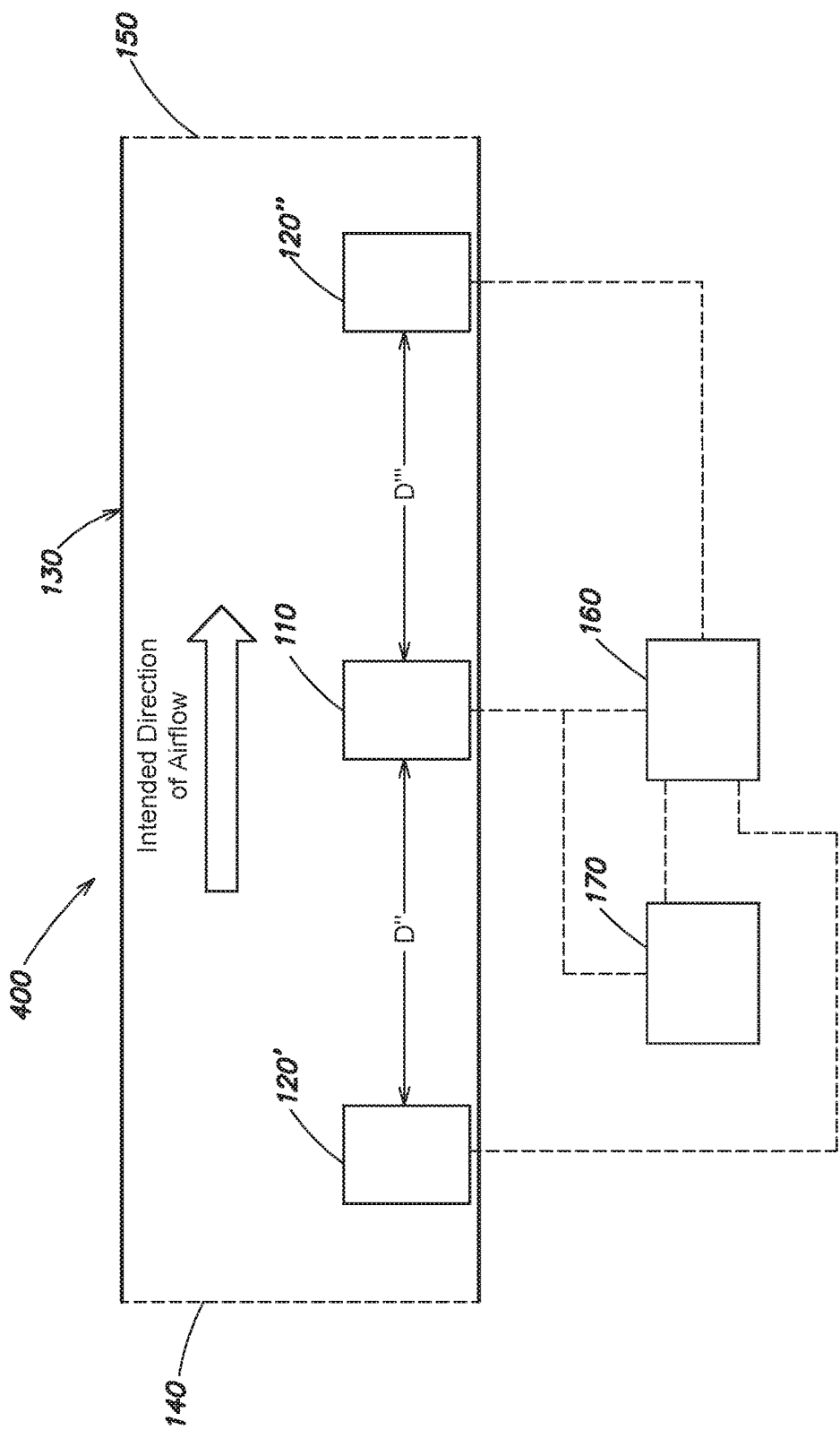
FIG. 4 is a schematic view of another embodiment of an airflow monitoring apparatus.

In another embodiment of the system, indicated generally at 400 in FIG. 4, the airflow monitor system 400 may include a pair of ion detectors 120', 120", located on opposite sides along a lengthwise extent of the conduit 130 from an ion generator 110. The ion detectors 120', 120" may each include one or more antennas 180 as shown in FIG. 2 in communication with a detector circuit and/or monitor/controller 160 as in the embodiments described above. The ion detectors 120', 120" may be configured substantially similarly or identical to one another, or may be configured differently from one another. The ion detectors 120', 120" may be spaced at equal or non-equal distances D", D''', respectively, from the ion generator 110. In some embodiments, the ion detectors 120', 120" may include a single antenna each. A differential amplifier in a detector circuit may be used to compare electrical signals from the single antenna in each of the ion detectors 120', 120". A differential signal between the antennas may provide an indication of a passage of a packet of ions proximate one of the ion detectors 120', 120". A polarity of the differential signal may indicate which of the ion detectors 120', 120" the packet of ions passed.

In other embodiments, the ion detectors 120', 120" may include multiple antennas each. The detector circuit may compare electrical signals between antennas within a single ion detector 120', 120" and/or between antennas in the different ion detectors 120', 120" to provide an indication of a passage of a packet of ions proximate one of the ion detectors 120', 120". In some embodiments, multiple ion detectors 120 may be disposed on one or both of the upstream and downstream sides of the ion generator 110.

The airflow monitor system 400 may be capable of providing measurements of airflow from both the upstream end 140 to the downstream end 150 of the conduit 130 and from the downstream end 150 to the upstream end 140 of the conduit 130. A detection of airflow from the downstream end 150 to the upstream end 140 of the conduit 130 may be indicative of a fault where a pressure differential across the conduit 130 is inverted from an intended pressure differential.

The pair of ion detectors 120', 120" of the airflow monitor system 400 may also provide for a mechanism to detect a fault in the airflow monitor system 400. For example, if the ion generator 110 produces a pulse of ions, and neither of the ion detectors 120', 120" registers a signal indicative of passage of the pulse of ions by the ion detectors 120', 120", this may be indicative of one the ion generator 110 and/or one or both of the ion detectors 120', 120" being faulty.

In other embodiments, airflow through the conduit 130 may not have a preferred direction. For example, in some implementations the conduit 130 may be disposed in a location where it is desirable to have no pressure difference across the conduit 130 and thus no airflow in either direction through the conduit 130. In such implementations a "good" airflow measurement would include the detection of no signal at both a first ion detector 120' at one end of the conduit and at a second ion detector 120" at a second end of the conduit after generation of ions by the ion generator 110. Alternatively a "good" airflow measurement would include the detection of the passage of ions across both the first ion detector 120' and the second ion detector 120" at approximately the same time due to, for example, the natural flow of ions away from the ion generator 110 under the influence of electrostatic repulsion and/or diffusion. Additionally or alternatively, threshold detection and/or an integration of signals from both of the ion detectors 120', 120" over time may be performed to determine if the total charge passing each of the ion detectors 120', 120" is approximately the same and thus that airflow through the conduit 130 is not preferentially directing ions to one of the ion detectors 120', 120".

In some embodiments, an airflow monitor system in accordance with any of the embodiments described above may include means for reducing or eliminating interference or electrical noise caused by ambient electromagnetic interference at the ion detectors 120. For example, as described above, when an ion detector 120 includes a pair of antennas 180, the pair of antennas 180 may be electrically matched so that a detector circuit may remove or ignore electrical noise common to the pair of antennas 180. Additionally or alternatively, the conduit 130 may be configured to retard or eliminate the propagation of electromagnetic interference into the conduit 130 and to the antenna(s) 180 of the ion detector(s) 120. In some embodiments, the conduit 130 may include or be formed from one or more electrically conductive materials, for example, a wire mesh, a layer of a conductive metal, a conductive polymer, a layer or mesh of carbon, or any other suitable conductive material. The upstream end 140 and downstream end 150 of the conduit 130 may be covered by a screen of a conductive material, for example, a metal screen, a conductive polymer screen, a screen of a conductive carbon containing material, or any other suitable conductive material. The conduit 130 and screens on the upstream end 140 and downstream end 150 of the conduit 130 may thus function as a Faraday cage to suppress the passage of electromagnetic interference from outside the conduit 130 into the conduit 130 and to the antenna(s) 180 of the ion detector(s) disposed in the conduit 130. Also, the conductive screens on the upstream end 140 and downstream end 150 of the conduit 130 may reduce or eliminate the emission of ionized gas from the monitoring system. In some embodiments, the conduit 130 may be grounded to keep charge from building up on internal surfaces of the conduit 130 and to reduce or eliminate electromagnetic emissions from the airflow monitor system. In some embodiments, a first conductive screen may disposed at a location recessed into the conduit 130 proximate the upstream end 140 and a second conductive screen may disposed at a location recessed into the conduit 130 proximate the downstream end 150.

In use, embodiments of the airflow monitoring system disclosed herein may be placed anywhere that it is desirable to monitor airflow or pressure differential across a region of space. For example, an embodiment of the airflow monitoring system disclosed herein may be disposed at an inlet, an outlet, or across an electronic equipment rack in a data center. An embodiment of the airflow monitoring system disclosed herein may be disposed at an entrance to a ceiling plenum or proximate or across an air flow passageway through a raised floor in a data center. Embodiments of the airflow monitoring system disclosed herein may be used to provide an indication of airflow across any desired region of space to a control system. The control system may adjust the speed of one or more fans to achieve a desired airflow across a region of space based on feedback from the airflow monitoring system. Additionally or alternatively, portions of a room, for example, the location or state of one or more floor or ceiling tiles, louvers, or openings in one or more electronic equipment racks may be adjusted based upon feedback from the airflow monitoring system to achieve a desired airflow through a region of space in the room. Although described above with reference to a data center, the room may be any room in which it may be desirable to maintain a particular airflow across different regions of the room or through a cooling system associated with the room, for example, a semiconductor fabrication clean room, a sterile medical procedure room, a chemical or biological laboratory, or a biological containment or testing room.

Figure 5:
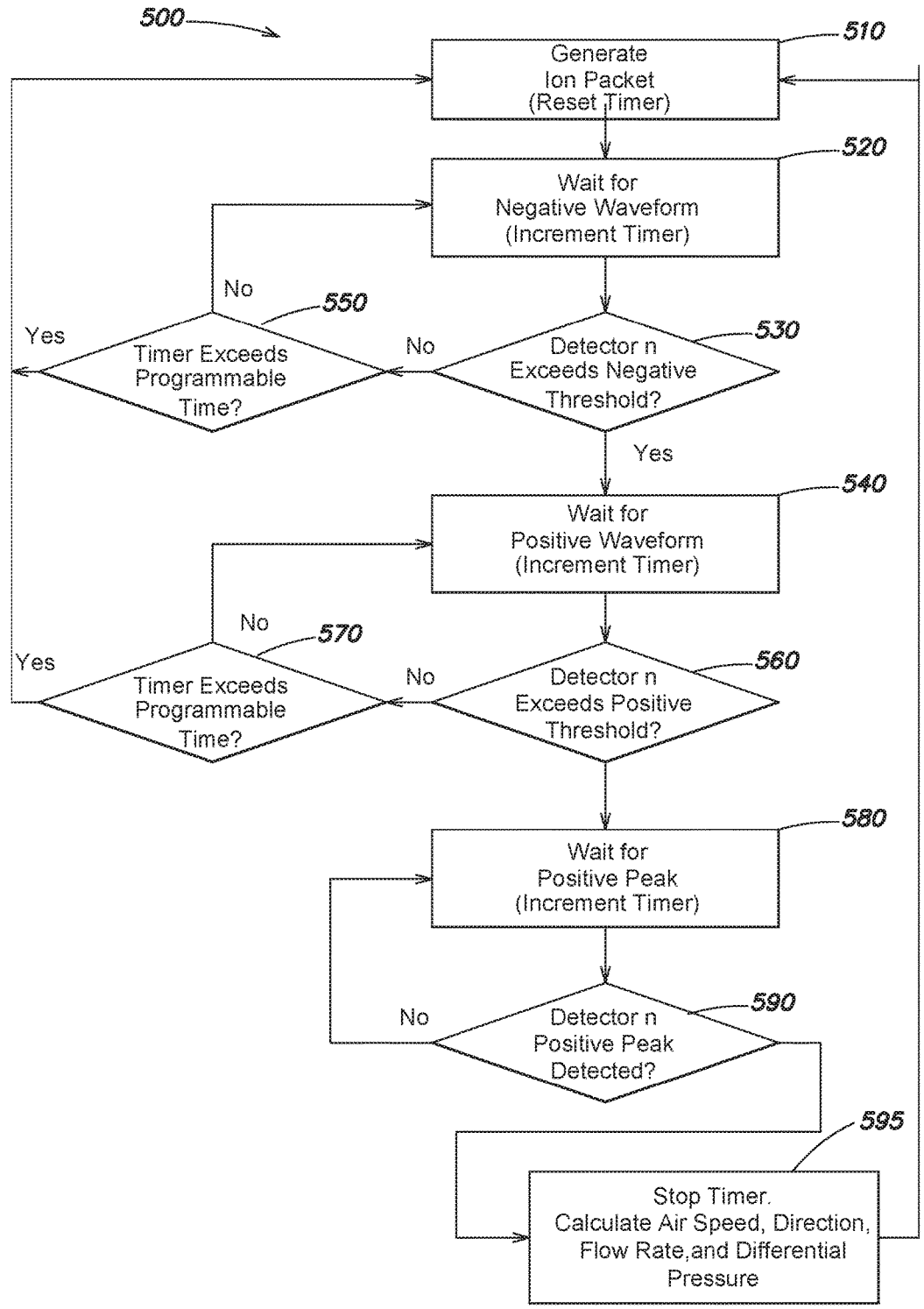
FIG. 5 is a flowchart of a method of operating an embodiment of an airflow monitoring apparatus.

A flow chart depicting a method of calculating airflow with an embodiment of an airflow monitoring system as disclosed herein is depicted in the flowchart 500 of FIG. 5. The flowchart 500 describes a method utilizing an airflow monitoring system including a single ion generator 110 and a single ion detector 120. The ion detector includes a pair of antennas 180, for example, as illustrated in FIG. 2. The antennas 180 are referred to as positive and negative antennas 180 based on which terminal of a comparator in an associated detector circuit each is electrically coupled to. The negative antenna 180 is placed upstream of the positive antenna 180 and closer to the ion generator 110 than the positive antenna 180. The method utilizes the time it takes for an ion packet to travel from the ion generator 110 to the positive antenna 180 to calculate airflow through the airflow monitoring system.

In act 510, the ion generator 110 generates an ion packet. The ion packet may be generated by the application of a pulse of high voltage electricity to a pin or a wire functioning as an ionization emitter in a conduit 130 forming the body of the airflow monitoring system. The high voltage pulse may have a voltage sufficient to ionize atoms or molecules in the air in the conduit proximate the ion generator, for example, about 5,000 volts, and a pulse width of, for example, between about 1 microsecond and about 1 millisecond, or in some embodiments, as short as a few nanoseconds, for example, less than about 10 nanoseconds. The ion generator 110 or high voltage electricity source 170 which supplies the high voltage pulse sends a signal to a monitor/controller 160 indicating when the high voltage pulse was delivered to the ion generator 110.

In act 520, the monitor/controller 160 increments a timer while waiting for a signal from the negative electrode 180 indicative of the ion packet generated by the ion generator reaching the negative electrode 180. The monitor/controller 160 may continue to increment the timer until it receives a signal from the negative electrode having a value (or absolute value) greater than a predetermined threshold value, for example, a signal indicative of a voltage more negative than a threshold negative voltage (act 530). If a signal having a value (or absolute value) greater than the predetermined threshold value is not received by the monitor/controller 160 from the negative electrode 180 within a maximum time period (act 550), another ion packet may be generated by the ion generator 110 and/or the monitor/controller 160 may provide an indication of a fault condition.

Upon receipt of a signal from the negative electrode 180 indicative of the ion packet generated by the ion generator 110 reaching the negative electrode 180, the monitor/controller 160 continues to increment the timer and begins to monitor the positive electrode 180 for a signal from the positive electrode 180 indicative of the ion packet generated by the ion generator reaching the positive electrode 180 (act 540). The monitor/controller 160 may continue to increment the timer until it receives a signal from the positive electrode having a value (or absolute value) greater than a predetermined threshold value, for example, a signal indicative of a voltage more positive than a threshold positive voltage (act 560). If a signal having a value (or absolute value) greater than the predetermined threshold value is not received by the monitor/controller 160 from the positive electrode 180 within a maximum time period (act 570), the timer may be reset and another ion packet may be generated by the ion generator 110 and/or the monitor/controller 160 may provide an indication of a fault condition. In some embodiments, the maximum time period used in act 570 may be different, for example, greater than the maximum time period used in act 550. The absolute value of the threshold signal values used in acts 530 and 560 may be the same or different.

Once the signal from the positive electrode having a value (or absolute value) greater than the predetermined threshold value is received (act 560), the monitor/controller 160 continues to increment the timer and continues to monitor the signal from the positive electrode 180 until the signal from the positive electrode reaches a peak value (acts 580, 590). The peak value of the signal from the positive electrode 180 may be detected by monitoring the first or second derivatives of the signal from the positive electrode 180 or by any other signal processing method known in the art. Once the peak value of the signal from the positive electrode 180 is detected, the monitor/controller 160 stops the timer and calculates the air speed, airflow direction (in the case that the airflow monitoring system includes plural ion detectors as in the embodiment of FIG. 4), air flow rate, and/or differential pressure across the airflow monitoring system. Alternatively, the timer may be stopped when the signal from the positive electrode has a value which reaches the predetermined threshold. In some embodiments, however, stopping the timer upon detection of the peak value of the signal rather than the threshold value may provide more accurate measurement results because the threshold values may differ between the negative antenna and the positive antenna.

The air speed may be determined by dividing the total time recorded by the timer by the distance between the ion generator 110 and the second antenna 180 of the ion detector 120 or by comparing the total time recorded by the timer to a lookup table or a curve of a previously calibrated relationship between air speed through the airflow monitoring system and time of flight of the ion packet between the ion generator 110 and ion detector 120. Air flow rate may be calculated by multiplying the calculated air speed by the cross sectional area of the conduit 310 of the airflow monitoring system. Differential pressure across the airflow monitoring system may be calculated using known methods which take into account the geometry of the conduit 310 of the airflow monitoring system and the calculated air speed or air flow rate, or by comparing the calculated air speed or air flow rate to a lookup table or a curve of a previously calibrated relationship between air speed or air flow rate and differential pressure across the airflow monitoring system. Air conditions, for example, relative humidity and/or absolute pressure, may be additional parameters utilized in a lookup table used to determine differential pressure from a measured air speed or air flow rate across the airflow monitoring system.

Various embodiments disclosed herein may be implemented on one or more computer systems. These computer systems may be, for example, general-purpose computers such as those based on Intel Core®-type processors or XEON®-type processors, AMD FX®-type processors, or any other type of processor. The computer systems may include one or more microcontrollers. It should be appreciated that one or more of any type of computer system may be used to partially or fully automate the monitoring and control of airflow in an environment in accordance with the various embodiments disclosed herein. Further, software of the system may be located on a single computer or may be distributed among a plurality of computers attached by a communications network.

The computer system may include specially-programmed, special-purpose hardware, for example, an application-specific integrated circuit (ASIC) or microcontroller. Aspects and embodiments disclosed herein may be implemented in software, hardware, or firmware, or any combination thereof. Further, such methods, acts, systems, system elements and components thereof may be implemented as part of the computer system described above or as an independent component.

It should be appreciated that the aspects and embodiments disclosed herein are not limited to executing on any particular system or group of systems. Also, it should be appreciated that embodiments described herein are not limited to any particular distributed architecture, network, or communication protocol.

Various aspects and embodiments disclosed herein may be programmed using an object-oriented programming language, such as Java, C++, or C# (C-Sharp). Other object-oriented programming languages may also be used. Alternatively, functional, scripting, and/or logical programming languages may be used. Various aspects and embodiments disclosed herein may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

Further, on each of the one or more systems that include one or more components of an airflow monitoring and/or control system as disclosed herein, each of the components may reside in one or more locations on the system. For example, different portions of the components of a system for monitoring and/or controlling airflow in an environment may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

Figure 6:
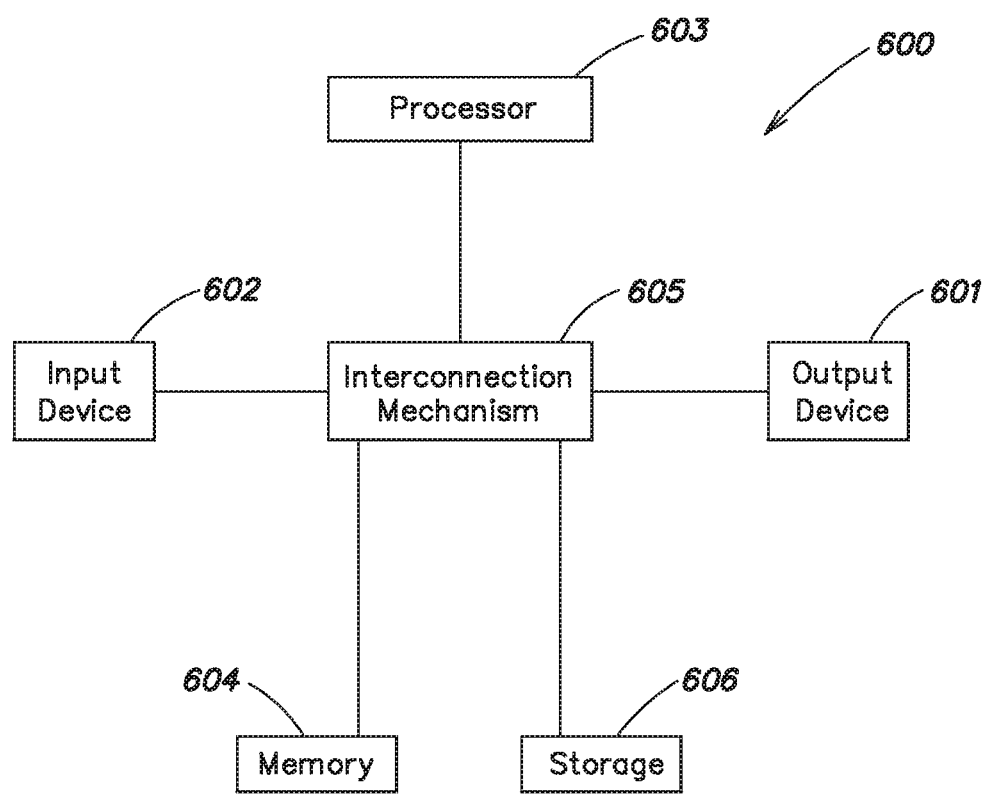
FIG. 6 is a schematic diagram of a computer system which may be utilized in various embodiments disclosed herein.

Various aspects and embodiments disclosed herein may be implemented as specialized software executing in a general-purpose computer system 600, such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and/or antennas 180 of ion detectors 120 and/or one or more detector circuits in the monitor/controller 160 of embodiments of systems and methods disclosed herein.

Computer system 600 also includes one or more output devices 601, for example, a printing device, display screen, and/or speaker. Computer system 600 may contain one or more interfaces (not shown) that connect computer system 600 to a communication network (in addition or as an alternative to the interconnection mechanism 605. Computer system 600 may be in communication with and capable of controlling various elements of the systems disclosed herein, for example, the ion generator(s) 110, and/or one or more elements of a cooling system, for example, a fan or a moveable baffle of a cooling system as described herein.

Figure 7:
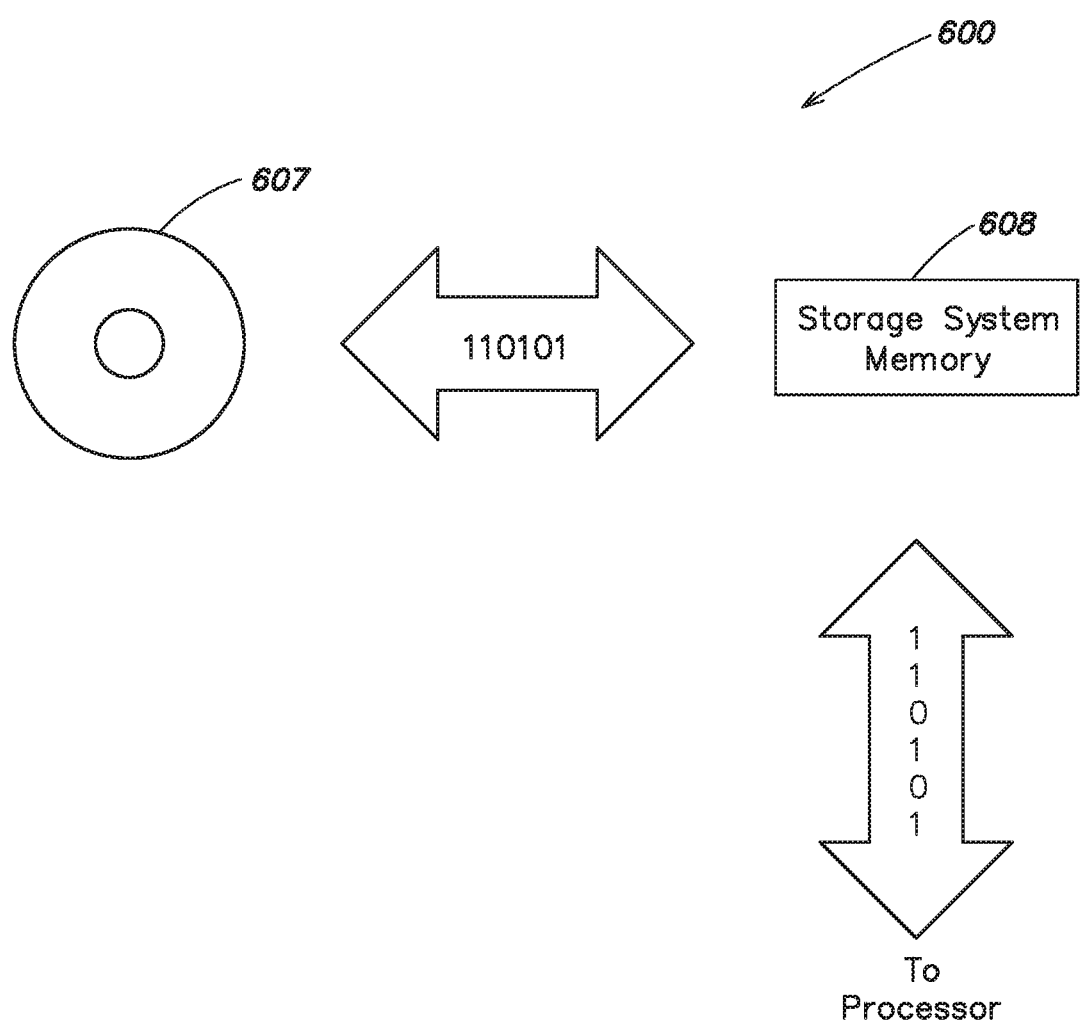
FIG. 7 is a schematic diagram of an embodiment of a storage system for the computer system of FIG. 6.

The storage system 606, shown in greater detail in FIG. 7, typically includes a computer readable and writeable nonvolatile recording medium 607 in which signals are stored that define a program to be executed by the processor or information stored on or in the medium 607 to be processed by the program. The medium may, for example, be a disk or flash memory. Typically, in operation, the processor causes data to be read from the nonvolatile recording medium 607 into another memory 608 that allows for faster access to the information by the processor than does the medium 607. This memory 608 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 608 and then copies the data to the medium 607 after processing is completed. A variety of mechanisms are known for managing data movement between the medium 607 and the integrated circuit memory element 604, 608, and aspects and embodiments disclosed herein are not limited thereto. Aspects and embodiments disclosed herein are not limited to a particular memory system 604 or storage system 606.

Although computer system 600 is shown by way of example as one type of computer system upon which various aspects of the aspects and embodiments disclosed herein may be practiced, it should be appreciated that aspects and embodiments disclosed herein are not limited to being implemented on the computer system as shown in FIG. 6. Various aspects and embodiments disclosed herein may be practiced on one or more computers having a different architecture or components that that shown in FIG. 6.

Computer system 600 may be a general-purpose computer system that is programmable using a high-level computer programming language. Computer system 600 may be also implemented using specially programmed, special purpose hardware. In computer system 600, processor 603 is typically a commercially available processor such as the well-known Pentium® or Core® class processor available from the Intel Corporation. Many other processors are available. Such a processor usually executes an operating system which may be, for example, the Windows 7 or Windows 8 operating systems available from the Microsoft Corporation, MAC OS Snow Leopard, MAC OS Snow Lion operating systems available from Apple Computer, or UNIX available from various sources. Many other operating systems may be used.

The processor and operating system together define a computer platform for which application programs in high-level programming languages are written. It should be understood that aspects and embodiments disclosed herein are not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects and embodiments disclosed herein may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP).

It should be appreciated that aspects and embodiments disclosed herein are not limited to executing on any particular system or group of systems. Also, it should be appreciated that aspects and embodiments disclosed herein are not limited to any particular distributed architecture, network, or communication protocol.

Processes associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, C, C#, or C++, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

EXAMPLE

Figure 8:
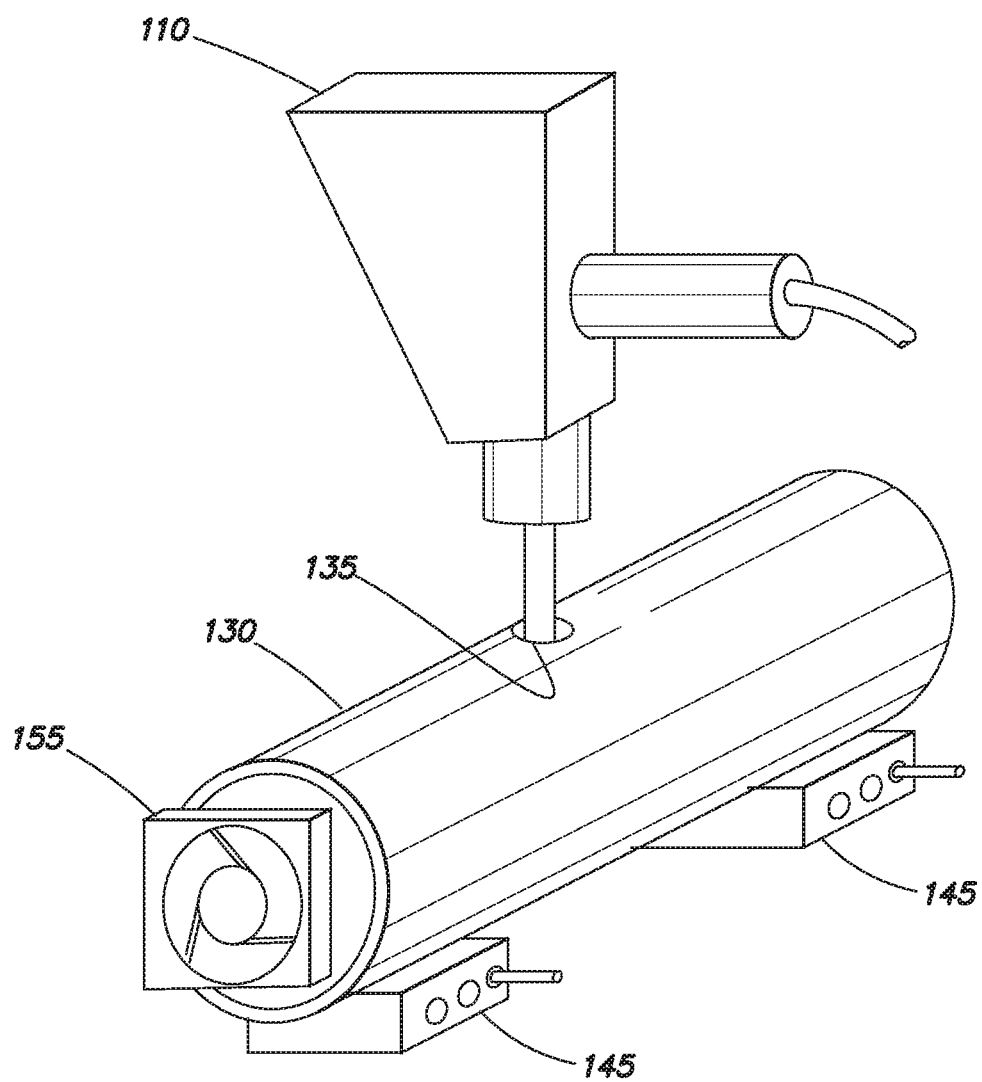
FIG. 8 is a perspective view of an airflow monitoring apparatus used in performing an airflow monitoring test.
Figure 9:
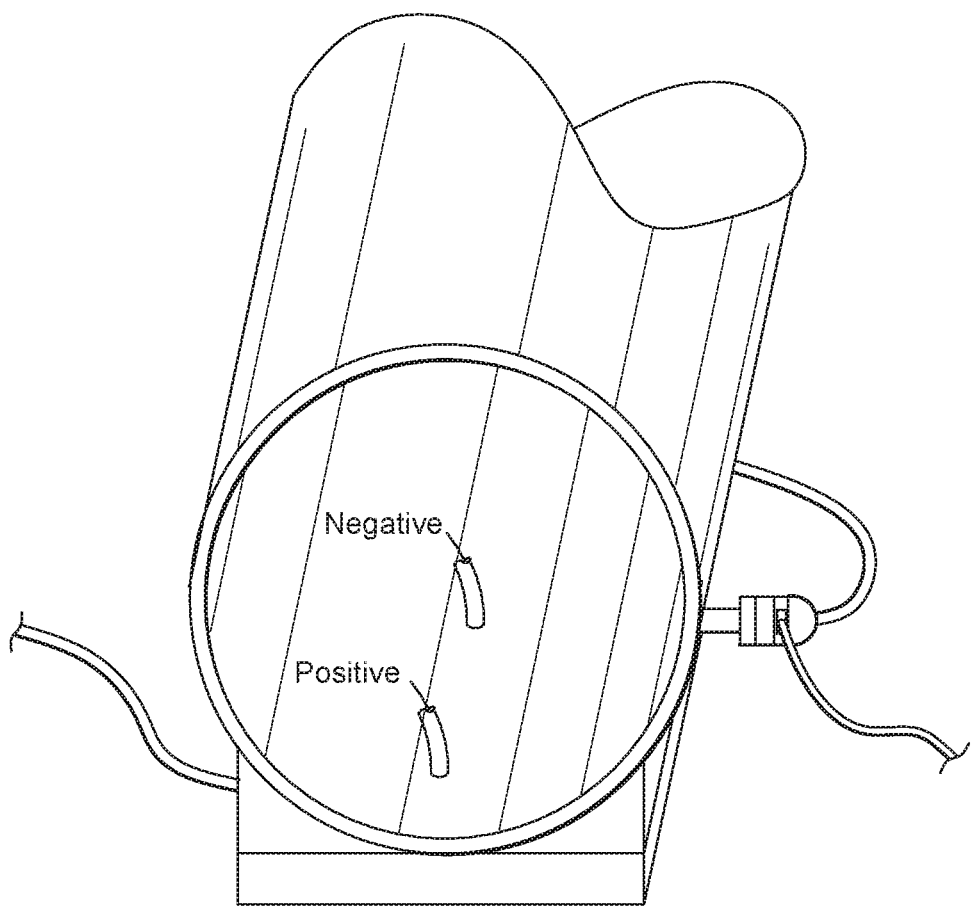
FIG. 9 is a photograph of a pair of antennas included in the airflow monitoring apparatus of FIG. 8.

A proof of concept test was performed to validate the ability to measure airflow with the use of ionized air in an embodiment of an airflow monitoring system as disclosed herein. The embodiment of the airflow monitoring system used for testing is illustrated in FIG. 8. The airflow monitoring system included a conduit 130 formed from a PVC tube approximately two feet (61 cm) in length and four inches (10.2 cm) in diameter. The ion generator 110 was an Model No. TSG 435 electrostatic discharge gun from Teseq AG. The ion generator 110 was inserted into an aperture 135 bored through the wall of the conduit 130 approximately halfway between the two ends of the conduit 130. A pair of electrically matched antennas formed of straight lengths of non-insulated wires (illustrated in the photograph in FIG. 9, one labeled "Positive" and the other labeled "Negative") were located proximate each end of the conduit. Detector circuitry including differential detectors in electrical communication with the antennas 180 was included in boxes 145 mounted to the bottom of the conduit 130. The detector circuitry was electrically coupled to an oscilloscope (not illustrated in FIG. 8) to provide signals from the antennas 180 to the oscilloscope for display. Airflow through the conduit 130 was provided by a DC electric fan 155.

Figure 10:
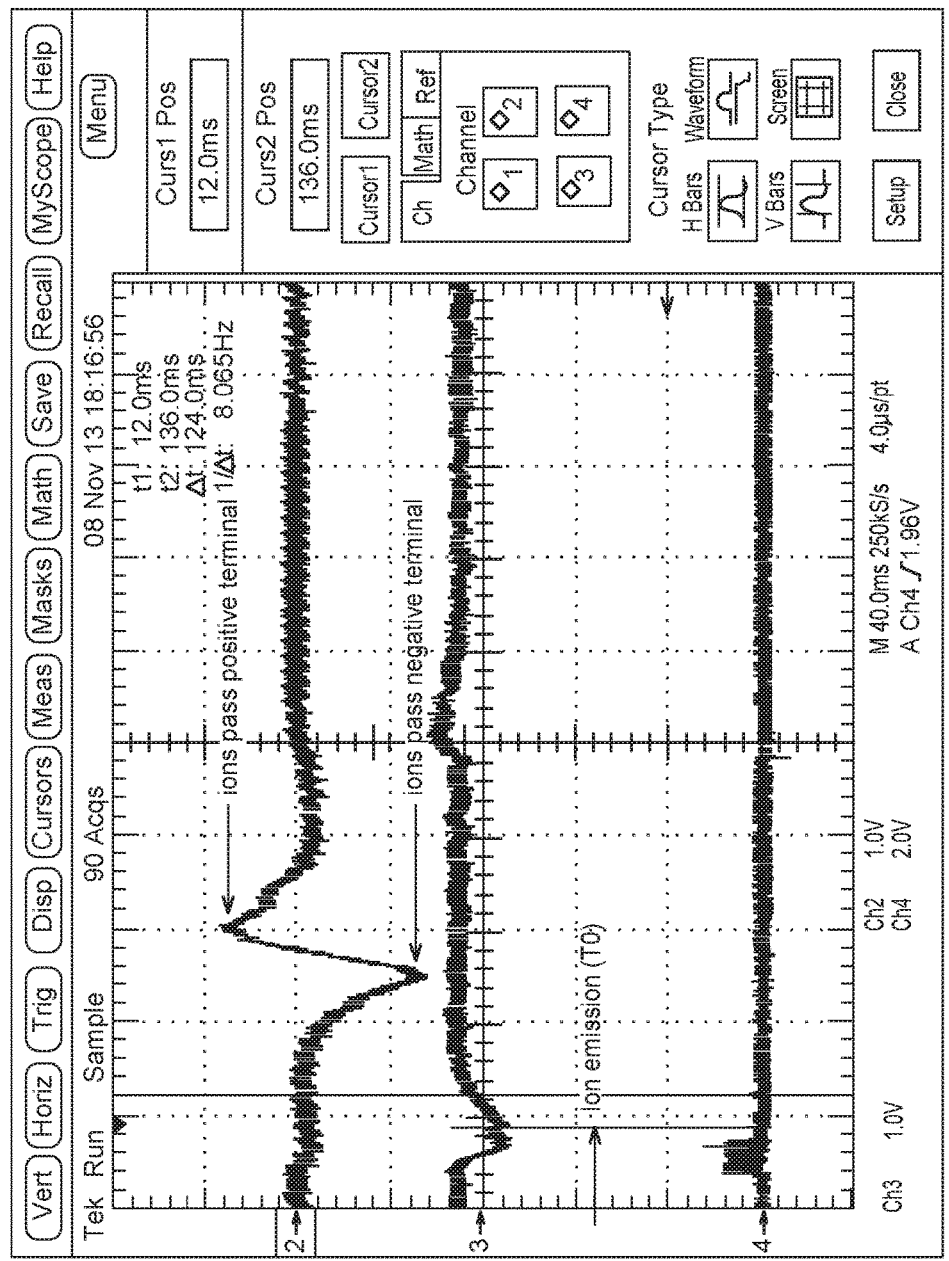
FIG. 10 is a photograph of an oscilloscope display including electrical traces of signals observed during testing of the airflow monitoring apparatus of FIG. 8.

Output signals displayed on the oscilloscope electrically coupled to the detector circuits for one measurement test are illustrated in FIG. 10. The oscilloscope was triggered by holding channel four of the oscilloscope close to the tip of the ion generator 110 when initiating a high voltage pulse. The trigger event is indicated by the spike in the channel four signal (the lowermost trace) in the oscilloscope display shown in FIG. 10. Electromagnetic interference associated with the ion generator 110 charging and discharging is seen on the channel three signal (the middle trace in FIG. 10). Channel two of the oscilloscope (the uppermost trace in FIG. 10) illustrates the signal from the differential detector monitoring the antennas 180 of the airflow monitoring system as the ion packet generated by the ion generator 110 approached and passed the antennas 180. The ion packet first caused the signal from the differential detector to move in a negative direction as the ions passed the negative antenna 180. The signal from the differential detector moved in a positive direction as the ion packet approached the positive antenna 180, crossing the baseline value as the ion packet moved between the negative and positive antennas 180, and then returned to baseline after the ion packet passed the positive antenna 180.

The time between the emission of the ion packed from the ion generator 110 until the ion packet passed the positive antenna 180 was calculated from the oscilloscope signals illustrated in FIG. 10 to be approximately 85 milliseconds. The distance between the ion generator 110 and the positive antenna 180 was approximately 12 inches (30.5 cm). The average air speed through the conduit 130 was thus calculated to be approximately 11.7 feet/second (357 cm/second).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Elements of any embodiment disclosed herein may be combined with or substituted for elements of any other embodiment disclosed herein. Accordingly, the foregoing description and drawings are by way of example only.

What is claimed is:

1. An airflow monitor system comprising:
   a controlled space;
   an ion generator positioned in the controlled space and configured to produce ions;
   a first ion detector positioned in the controlled space and spaced from the ion generator, the first ion detector being configured to detect ions produced by the ion generator and send one or more signals responsive to detecting the ions; and
   a controller configured to receive the one or more signals from the ion detector, to measure a time between emission of the ions from the ion generator and detection of ions at the ion detector, and to calculate a speed of airflow between the ion generator and the ion detector based on the measured time.

2. The system of claim 1, wherein the controlled space comprises a conduit.

3. The system of claim 2, wherein the conduit includes an upstream end and a downstream end, the ion generator is positioned between the upstream end and the downstream end, the first ion detector is positioned between the ion generator and the downstream end, and a second ion detector is positioned between the ion generator and the upstream end.

4. The system of claim 2, wherein the conduit is configured to attenuate propagation of electromagnetic interference from outside the conduit to the first ion detector.

5. The system of claim 2, wherein the controller is further configured to calculate a differential pressure between a first end of the conduit and a second end of the conduit based on the measured time.

6. The system of claim 1, further comprising a source of pulses of high voltage electricity in electrical communication with the ion generator.

7. The system of claim 1, wherein the controller is in communication with a cooling system of a room in which the airflow monitor system is disposed, and the cooling system is configured to adjust the speed of one or more fans of the cooling system responsive to the speed of airflow calculated by the controller.

8. The system of claim 1, wherein the first ion detector comprises a first antenna.

9. The system of claim 8, wherein the first ion detector further includes a second antenna.

10. The system of claim 9, wherein the controller includes a differential amplifier configured to measure a difference in voltage between the first antenna and the second antenna.

11. The system of claim 9, wherein the conduit includes an upstream end and a downstream end, the ion generator is positioned between the upstream end and the downstream end, the first antenna is positioned between the ion generator and the downstream end, and the second antenna is positioned between the ion generator and the upstream end.

12. The system of claim 9, wherein the first antenna and the second antenna are electrically matched.

13. A method of monitoring airflow across a region of space, the method comprising:
    generating a packet of ions in air at an ion generator;
    detecting ions produced by the ion generator at a first ion detector spaced from the ion generator by a distance; and
    calculating a speed of airflow between the ion generator and the first ion detector from the distance and a measured time between generating the packet of ions and detecting the ions.

14. The method of claim 13, wherein generating the packet of ions comprises generating the packet of ions within a conduit in which both the ion generator and the ion detector are disposed.

15. The method of claim 14, wherein the conduit includes an upstream end and a downstream end, the ion generator is positioned between the upstream end and the downstream end, the first ion detector is positioned between the ion generator and the downstream end, and a second ion detector is positioned between the ion generator and the upstream end and the method further comprises detecting the packet of ions at the second detector.

16. The method of claim 13, wherein the first ion detector includes a first antenna and a second antenna, and detecting the ions produced by the ion generator comprises detecting a differential voltage between the first antenna and the second antenna.

17. The method of claim 13, further comprising controlling a speed of a fan of a cooling system of a room in which the ion generator and the first ion detector are disposed responsive to a calculation of the speed of airflow between the ion generator and the first ion detector.

18. A non-volatile computer readable media having computer executable instructions included therein, which when executed by a controller of an airflow monitor system cause the airflow monitor system to:
    generate a packet of ions in air at an ion generator;
    detect ions produced by the ion generator at an ion detector spaced from the ion generator by a distance; and
    calculate a speed of airflow between the ion generator and the ion detector from the distance and a measured time between generating the packet of ions and detecting the ions.

19. The non-volatile computer readable media of claim 18, wherein the instructions cause the airflow monitor system to detect the ions produced by the ion generator by detecting a differential voltage between a first antenna of the ion detector and a second antenna of the ion detector.

20. The non-volatile computer readable media of claim 18, wherein the instructions cause the airflow monitor system to control a speed of a fan of a cooling system of a room in which the ion generator and the first ion detector are disposed responsive to a calculation of the speed of airflow between the ion generator and the ion detector.

* * * * *